United States Patent [19]

Lohr, Jr. et al.

[11] 4,051,103

[45] Sept. 27, 1977

[54] STABILIZATION OF POLYFLUOROPHOSPHAZENES WITH ZINC HIPPURATE

[75] Inventors: Delmar Frederick Lohr, Jr., Akron; Jung Wong Kang, Clinton, both of Ohio

[73] Assignee: The Firestone Tire & Rubber Company, Akron, Ohio

[21] Appl. No.: 771,231

[22] Filed: Feb. 23, 1977

[51] Int. Cl.$^2$ .................................................. C08K 5/09
[52] U.S. Cl. ............................................ 260/45.75 W
[58] Field of Search ..................... 260/2, 47, 45.75 W

[56] References Cited

U.S. PATENT DOCUMENTS

| | | | |
|---|---|---|---|
| 3,843,596 | 10/1974 | Kyker et al. | 260/45.75 R |
| 3,867,341 | 2/1975 | Kyker et al. | 260/45.75 W |
| 3,945,966 | 3/1976 | Vicic et al. | 260/2 P |
| 4,017,456 | 4/1977 | Lohr | 260/45.75 W |

OTHER PUBLICATIONS

Development of Thermally Stable Polyfluoroalkoxy Phosphazene Transmission Seals for the UH-1 Helicopter – Reynard (Sept. 1973) NTIS Publication, U.S. Dept. Commerce.
Polymer Engineering and Science – May 1975, vol, 15, No. 5, pp. 321 to 338.
Development Compounding & Evaluation of Phosphazene Rubber for Helicopter Seal Applications – Wilson (Oct. 1974) – U.S. Army Natick Laboratories Technical Report, Natick, Mass.
Phosphonitrilic Chemistry–Allcock, Apr. 22, 1968, Chemistry and Engineering Journal, pp. 68 to 81.

*Primary Examiner*—V. P. Hoke

[57] ABSTRACT

When polyphosphazenes are exposed to elevated temperatures, their physical properties deteriorate. The addition of zinc bis hippurate to polyphosphazene rubbers has been found to result in improved retention of the physical properties of polyphosphazenes. Further the use of such an additive does not adversely affect the ability of peroxy compounds to cure the polyphosphazenes to form vulcanizates.

11 Claims, No Drawings

STABILIZATION OF POLYFLUOROPHOSPHAZENES WITH ZINC HIPPURATE

This invention relates to the stabilization of polyphosphazenes against the deleterious effects of exposure to high temperatures. More particularly the invention comprises the incorporation of a metal bis hippurate into formulations intended to be vulcanized.

The addition of stabilizers to phosphonitrile elastomers is described in U.S. Pat. No. 3,843,596 issued on Oct. 22, 1974 disclosing the use of metal dialkyl-, alkylaryl- or diaryl-dithiocarbamates of zinc, lead or bismuth of various inorganic or metallo-organic compounds for this purpose. Another additive useful for the protection of polyphosphazene from thermal degradation when exposed to temperatures up to about 500 ° F in various environments is a metal 8-hydroxy quinolate, as described in U.S. Pat. No. 3,867,341 issued Feb. 18, 1975.

Other stabilizers for similar purposes are described in the open literature.

One objection to some of the stabilizers described in the prior art has been the adverse effect they have on the color of the resulting polymer products, or on the activity of other additives present in the compositions, e.g. on the effectiveness of the curing agents present.

One object of this invention is to stabilize polyphosphazenes against thermal degradation by means of additives which do not interfere with the curability of the compositions and which do not impart undesired discoloration to the compositions.

The polyphosphazenes to which the present invention is applicable include those described in the following recent U.S. Pat. Nos:

Evans, U.S. Pat. No. 3,271,330, Issued September 6, 1966; Allcock et al, U.S. Pat. No. 3,370,020, Issued February 20, 1968; Rose, U.S. Pat. No. 3,515,688, Issued June 2, 1970; Rose et al, U.S. Pat. No. 3,702,833, Issued November 14, 1972; Reynard et al, U.S. Pat. No. 3,700,629, Issued October 24, 1972; Reynard et al, U.S. Pat. No. 3,853,794, Issued December 10, 1974; Reynard et al, U.S. Pat. No. 3,856,712, Issued December 24, 1974; Rose et al, U.S. Pat. No. 3,856,713, Issued December 24, 1974; Reynard et al, U.S. Pat. No. 3,883,451, Issued May 13, 1975;

Cheng et al, U.S. Pat. No. 3,972,841, Issued August 3, 1976;

and to other linear polymers characterized by repeating sequence of

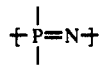

units in which up to 50,000 or more such units are present, in which various groups are attached to the P atoms, such groups including alkoxy, fluoroalkoxy, aryloxy, amino, arylalkoxy, and other groups, and to the phosphazenes described in a recent article on phosphazene chemistry in Chemical Reviews 1972, Volume 72, No. 4, particularly pages 349 –356.

The polymers to which the present invention applies includes both elastomers and thermoplastic materials. Such polymers exhibit a number of desirable properties but are found to degrade when exposed in air to temperatures of the order of about 275° or 300° F or higher for prolonged intervals of time.

In the present specification the term polyphosphazene is intended to include the polymers described in the above noted patents and other similar materials represented by the general formula

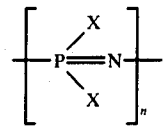

in which each X is a monovalent group such as alkoxy, substituted alkoxy including fluoroalkoxy, arloxy, substituted aryloxy, amino, and other such groups and the several X groups may all be the same or they may differ and $n$ is an integer greater than 3 and preferably between 20 and 50,000. Some of the X groups may include some unsaturation, e.g. as described in Cheng et al U.S. Pat. No. 3,972,841 issued Aug. 3, 1976.

Particularly preferred polyphosphazenes are those in which the substitutent groups randomly distributed along the —P=N— chain were —OCH$_2$CF$_3$, —OCH$_2$(CF$_2$)y CF$_2$H, in which $y$ is 1, 3, 5, 7 or 9 and mixtures thereof; and o-allylphenoxy groups, in the approximate ratio of 60-70:30-40: about 0.5%, by weight with a molecular number of 20 to 50,000 and a molecular weight distribution generally similar to that described in Table III of a Paper published in the Journal of Polymer Science, Vol. 14, Pages 1379–1395 (1976) by D. W. Carlson et al, but it is to be understood that the invention is applicable to a wide variety of polyphosphazene rubbers such as those described in the above noted patents.

The invention will be further understood from the examples which follow and which are intended to illustrate preferred embodiments of the invention but not to limit the same.

The polymer and filler plus all compounding ingredients except the peroxide curing agent were mixed for 10 minutes in a Brabender mixer. The master batch was cooled to ambient temperature and added to a 55° C mill and the curing agent added. The batch was then molded into slabs which were cured 30' at 171° C. test rings were cut from the slabs and aged hours at 172° C in a forced air oven. Physical properties of the aged rings were then compared to the unaged controls. Different levels of the stabilizer, zinc bis hippurate, were compounded in the following composition:

| Material | Parts |
|---|---|
| Polymer | 100.0 |
| Silica (Quso WR 82) | 30.0 |
| Magnesium Oxide | 6.0 |
| Peroxide (Vulcup 40 KE) | 1.15 |
| Stabilizer | Variable |

The following results were obtained:

| Stabilizer, phr | 0 | 0.5 | 1.0 | 1.5 | 2.0 |
|---|---|---|---|---|---|
| Modulus at 100% Elong., MPa | | | | | |
| Unaged | 7.8 | 7.9 | 7.8 | — | 7.6 |
| 240 Hrs. at 175° C | 2.9 | 3.6 | 3.8 | 4.6 | 5.3 |
| Retention, % | 37 | 46 | 49 | — | 70 |
| Tensile Strength, MPa | | | | | |
| Unaged | 8.8 | 8.8 | 8.1 | 6.2 | 8.4 |
| 240 Hrs. at 175° C | 4.9 | 5.0 | 5.0 | 5.3 | 6.3 |
| Retention, % | 56 | 57 | 62 | 85 | 75 |

MPa values in the above table are converted to pounds per square inch by dividing the MPa value by 0.006895.

The preferred metal bis hippurate for the present invention is the zinc compound which has been found to be more effective than the magnesium compound. Some other metal hippurates such as those of nickel or cobalt appear to contribute substantially no noticeable stabilizing effect.

The amount of the stabilizers of this invention found useful depends on the retention of properties which is desired and ranges from an amount effective for this purpose up to about 5 parts by weight per hundred parts of phosphazene polymer, by weight, a generally preferred range being between about 0.5 to 5 parts per hundred of polymer.

In addition of zinc bis hippurate improves the high temperature resistance of polyfluorophosphazene vulcanizates. The following data illustrate the invention:

| Stabilizer, phr. | 0 | 1.2 |
| --- | --- | --- |
| Modulus at 100% Elong., MPa | | |
| Unaged | 7.2 | 8.2 |
| 240 Hrs. at 175° C | 3.3 | 6.7 |
| Retention, % | 40 | 82 |
| Tensile, MPa | | |
| Unaged | 10.3 | 8.6 |
| 240 Hrs. at 175° C | 6.7 | 7.7 |
| Retention, % | 65 | 90 |

The formula for zinc bis hippurate is

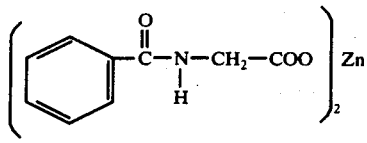

Having now described a preferred embodiment of the invention it is not intended that it be limited except as may be required by the appended claims.

We claim:

1. A polyphosphazene composition stabilized against thermal aging comprising (1) a polyphosphazene represented by the general formula:

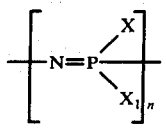

wherein $n$ represents an integer from 20 up to about 50,000 and X and $X_1$ each represent a monovalent substituent selected from the groups consisting of alkoxy, substituted alkoxy, aryloxy, substituted aryloxy, hydroxy, and amino, and X and $X_1$ are randomly distributed along the —P=N— backbone and the polyphosphazene includes one or two or more randomly distributed groups, and (2) a stabilizer consisting of an organic compound compatible with said polyphosphazene and present in an amount sufficient to stabilize said polyphosphazene against thermal degradation, said organic compound being zinc bis hippurate.

2. The composition of claim 1 wherein the zinc bis hippurate is present in an effective amount up to 5.0% by weight.

3. The stabilized polyphosphazene composition of claim 1 wherein X and $X_1$ are fluoroalkoxy or fluoroaryloxy groups.

4. Elastomers containing essentially of the stabilized polyphosphazenes of claim 1.

5. Plastics consisting essentially of the stabilized polyphosphazenes of claim 1.

6. Thermoplastic elastomers consisting essentially of the stabilized polyphosphazenes of claim 1.

7. Fibers consisting essentially of the stabilized polyphosphazenes of claim 1.

8. Vulcanized articles consisting essentially of the stabilized polyphosphazenes of claim 1.

9. Peroxide cured polyphosphazene compositions of claim 1 in which from 0.2 to 0.5 percent of the groups $X$ or $X_1$ are unsaturated.

10. The compositions of claim 9 in which the groups X and $X_1$ are trifluoroethoxy, $OCH_2(CF_2)_yCF_2H$ and o-allylphenoxy in which $y$ is either 1, 3, 5, 7 or 9 and mixtures thereof.

11. The composition of claim 10 in which the molar ratio in % of trifluoroethoxy to telomer fluoroalkoxy is between 70:30 and 30:70 and which contains in addition from 0.2 to 5.0 wt. % o-allylphenoxy groups.

* * * * *

UNITED STATES PATENT OFFICE
CERTIFICATE OF CORRECTION

Patent No. 4,051,103      Dated September 27, 1977

Inventor(s) Delmar Frederick Lohr, Jr. and Jung Wong Kang

It is certified that error appears in the above-identified patent and that said Letters Patent are hereby corrected as shown below:

Column 2, line 45, 172°C should read as -- 175°C ---

Column 4, Claim 9, Line 37, reads 0.2 to 0.5 percent, this should read as --- 0.2 to 5.0 percent ---

Signed and Sealed this

Eighteenth Day of April 1978

[SEAL]

Attest:

RUTH C. MASON
*Attesting Officer*

LUTRELLE F. PARKER
*Acting Commissioner of Patents and Trademarks*